United States Patent
Bowers et al.

(10) Patent No.: US 6,299,200 B1
(45) Date of Patent: Oct. 9, 2001

(54) SIDE IMPACT AIR BAG MODULE WITH SHROUD

(75) Inventors: Paul A. Bowers, Ray, MI (US); Timothy A. Swann, Mesa, AZ (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/618,900

(22) Filed: Jul. 18, 2000

(51) Int. Cl.$^7$ ................................................. B60R 21/26
(52) U.S. Cl. ..................... 280/730.2; 280/736; 280/740
(58) Field of Search ........................... 280/730.1, 730.2, 280/736, 740, 741, 742

(56) References Cited

U.S. PATENT DOCUMENTS

| | | |
|---|---|---|
| 3,527,472 | 9/1970 | Chute et al. . |
| 3,674,059 | 7/1972 | Stephenson . |
| 3,968,980 | 7/1976 | Hay . |
| 4,981,534 | 1/1991 | Scheffee . |
| 5,131,680 | 7/1992 | Coultas et al. . |
| 5,184,846 | 2/1993 | Goetz . |
| 5,308,108 | 5/1994 | Rion . |
| 5,918,898 | 7/1999 | Wallner et al. . |
| 6,022,044 | * 2/2000 | Cherry . |
| 6,106,006 | * 8/2000 | Bowers et al. . |
| 6,152,484 | * 11/2000 | Fischer et al. . |
| 6,231,069 | * 5/2001 | Yokoyama . |

* cited by examiner

Primary Examiner—Paul N. Dickson
(74) Attorney, Agent, or Firm—Tarolli, Sundheim, Covell, Tummino & Szabo L.L.P.

(57) ABSTRACT

An apparatus (10) for helping to protect an occupant of a vehicle (12) includes an inflatable protection device (14), an inflator (50), and a fill tube (22). The inflator (50) is electrically actuated to provide inflation fluid for inflating the protection device (14). The inflator (50) has a longitudinal axis (60), a first end portion (54) with a fluid outlet (62), a central portion (52), and a second end portion (56) opposite the first end portion. The fill tube (22) extends from a location adjacent the second end portion (56) of the inflator (50) for directing inflation fluid from the inflator (50) into the protection device (14). A directing assembly (20) directs inflation fluid from the fluid outlet (62) of the inflator (50) to the fill tube (22). The directing assembly (20) includes a shroud (90) with a chamber (95). The chamber (95) receives the inflator (50). A manifold (70) is located at the second end portion (56) of the inflator. The manifold (70) is in fluid communication with the fill tube (22) and the chamber (96). The shroud (90) defines a fluid flow passage (96) between the fluid outlet (62) of the inflator (50) and the manifold (70).

9 Claims, 3 Drawing Sheets

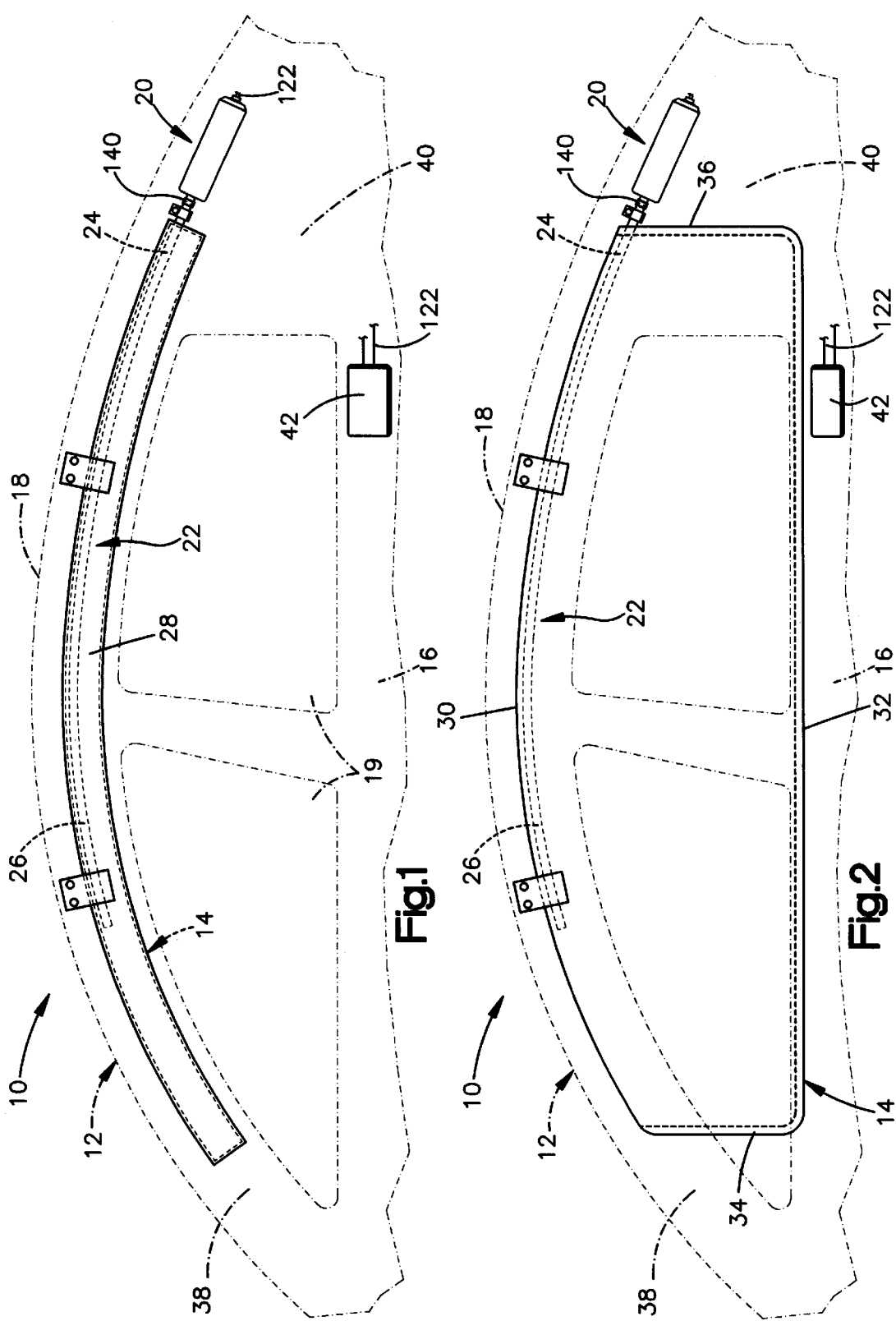

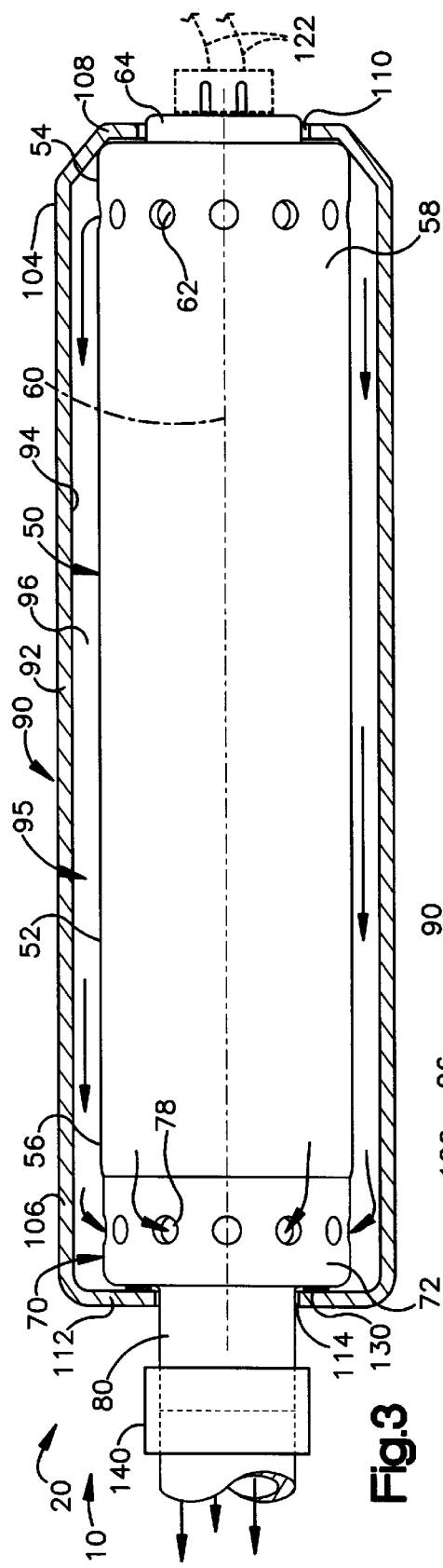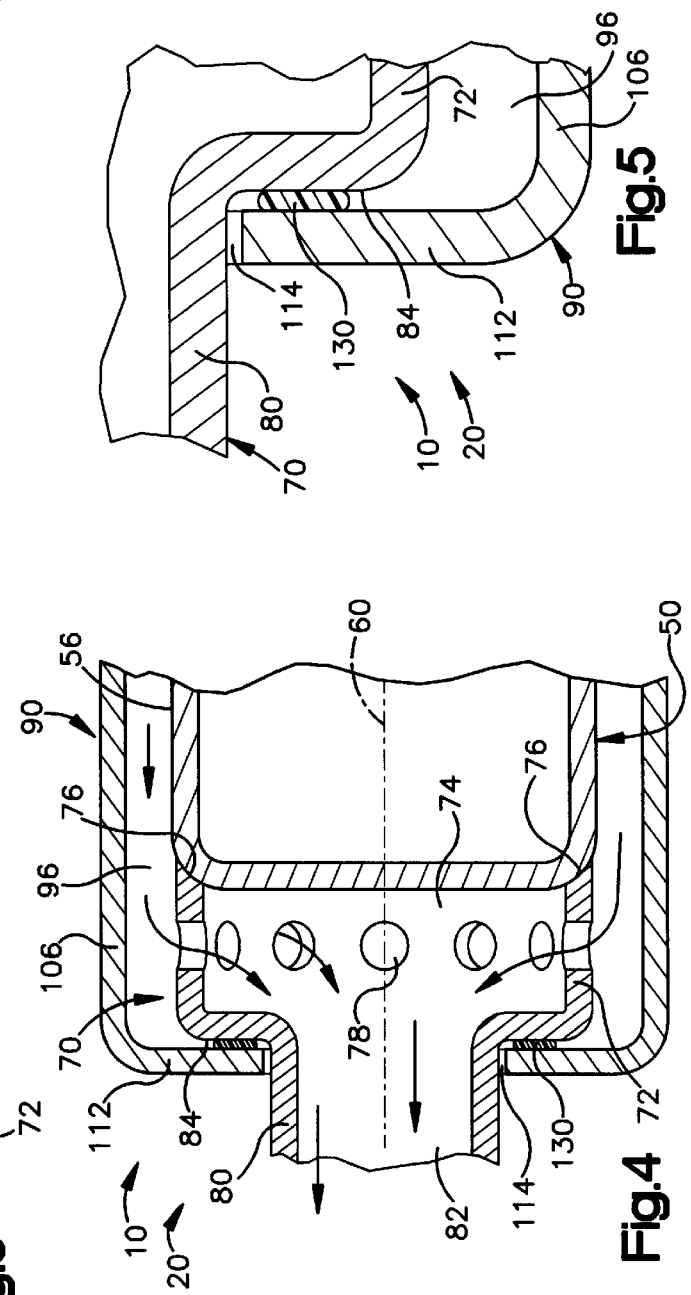

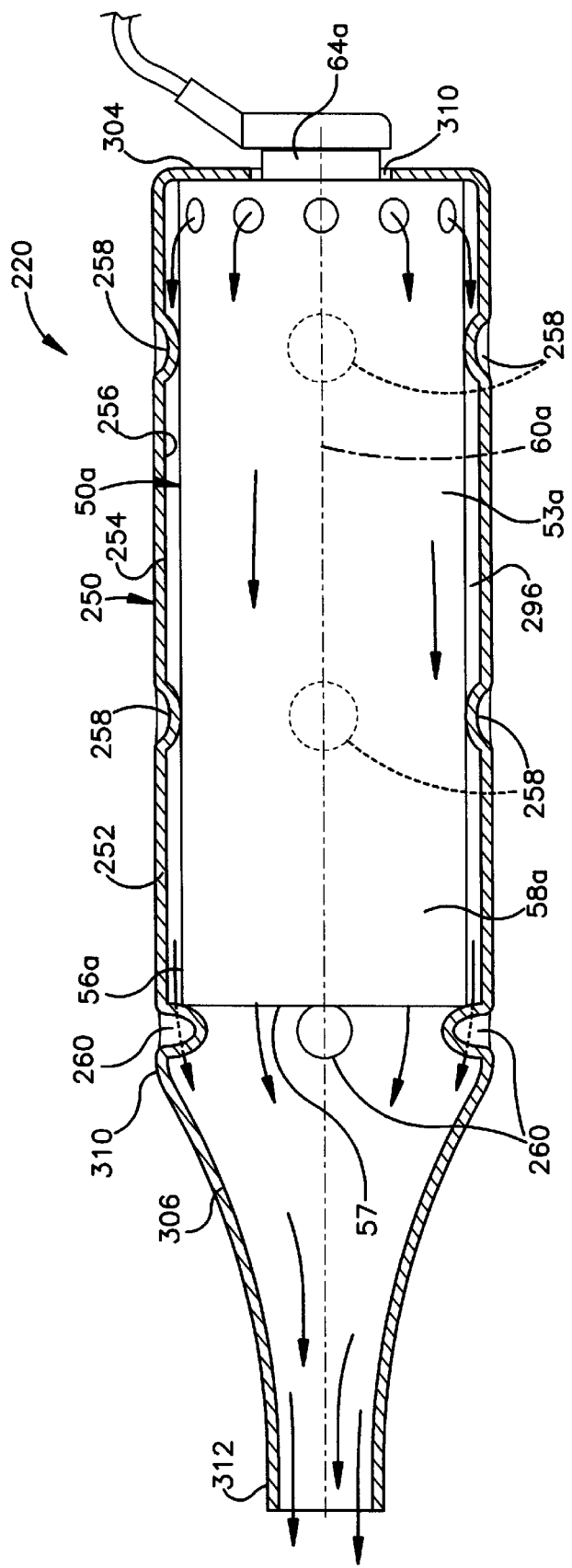

SIDE IMPACT AIR BAG MODULE WITH SHROUD

BACKGROUND OF THE INVENTION

1. Technical Field

The present invention relates to a vehicle safety apparatus and particularly relates to an air bag module including an inflatable vehicle occupant protection device, such as an air bag, for helping to protect a vehicle occupant in the event of a side impact to the vehicle.

2. Description of the Prior Art

It is known to inflate an air bag to help protect a vehicle occupant in the event of a side impact to a vehicle of a magnitude above a predetermined threshold. The air bag is stored in a deflated condition, together with an inflator, in a vehicle roof, for example. In the event of a side impact to the vehicle of a magnitude above the predetermined threshold, the inflator is actuated. The air bag is then inflated into a position between the vehicle occupant in the vehicle seat and the adjacent side structure of the vehicle such as a door or window of the vehicle or a body panel of the vehicle. The air bag helps protect the vehicle occupant from forcefully striking or being struck by parts of the side structure of the vehicle. The air bag can also help protect the vehicle occupant from objects which might intrude into the vehicle, such as a pole or a tree, during the side impact.

SUMMARY OF THE INVENTION

The present invention is an apparatus for helping to protect an occupant of a vehicle in the event of a side impact to the vehicle or a rollover of the vehicle. The apparatus comprises an inflatable vehicle occupant protection device having a deflated condition and being inflatable into a position adjacent to the vehicle occupant for helping to protect the vehicle occupant. The apparatus also comprises an inflator electrically actuatable to provide inflation fluid for inflating the protection device. The inflator has a longitudinal axis, a first end portion having a fluid outlet, a central portion, and a second end portion opposite the first end portion. The apparatus further comprises a fill tube extending from a location adjacent the second end portion of the inflator for directing inflation fluid from the inflator into the protection device. The apparatus still further comprises an assembly for directing inflation fluid from the fluid outlet of the inflator to the fill tube. The assembly comprises a shroud having a chamber for receiving the inflator. A manifold is located at the second end portion of the inflator and is in fluid communication with the fill tube and the chamber. The shroud defines a fluid flow passage between the fluid outlet of the inflator and the manifold.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an apparatus constructed in accordance with the present invention illustrating a side curtain in a stored condition;

FIG. 2 is a schematic view of the apparatus of FIG. 1 illustrating the side curtain in an inflated condition;

FIG. 3 is a view, partially in section, of an inflator assembly that forms a part of the apparatus of FIG. 1;

FIG. 4 is an enlarged sectional view of a portion of the inflator assembly of FIG. 3;

FIG. 5 is a further enlarged, fragmentary view of a portion of the inflator assembly of FIG. 3; and FIG. 6 is a view similar to FIG. 3 of an apparatus constructed in accordance with a second embodiment of the present invention.

DETAILED DESCRIPTION OF EMBODIMENTS OF THE INVENTION

The present invention relates to an inflatable vehicle occupant protection device, such as a side curtain. As representative of the present invention, FIG. 1 illustrates an apparatus 10 for helping to protect an occupant of a vehicle 12. The apparatus 10 includes a vehicle occupant protection device in the form of a side curtain 14, which is mounted adjacent to the side structure 16 of the vehicle 12 and a roof 18 of the vehicle 12. The side structure 16 of the vehicle 12 includes side windows 19.

The apparatus 10 includes an inflator assembly 20, described below in detail, for inflating the side curtain 14. The inflator assembly 20 is connected in fluid communication with the side curtain 14 through a fill tube 22. The fill tube 22 has a first end portion 24 for receiving fluid from the inflator assembly 20. The fill tube 22 has a second end portion 26, which is disposed in the side curtain 14. The second end portion 26 of the fill tube 22 has a plurality of openings (not shown), which provide fluid communication between the fill tube 22 and the side curtain 14.

The apparatus 10 includes a housing 28 (FIG. 1), which stores the side curtain 14 in a deflated condition. The fill tube 22, the deflated side curtain 14, and the housing 28 have an elongate configuration and extend along the vehicle roof 18 and along the side structure 16 of the vehicle 12 above the side windows 19.

The side curtain 14 (FIG. 2) includes a top edge 30 and an opposite bottom edge 32. The top edge 30 is positioned adjacent to the intersection of the roof 18 and the side structure 16 of the vehicle 12. The side curtain 14 also includes a front edge 34 and an opposite rear edge 36. The front edge 34 is positioned adjacent to an A-pillar 38 of the vehicle 12. The rear edge 36 is positioned adjacent to a C-pillar 40 of the vehicle 12.

The apparatus 10 further includes a known means 42 for sensing a side impact to the vehicle 12 and for actuating the inflator assembly 20 in response to the sensing of the side impact. The means 42 may include a side impact sensor and vehicle circuitry for electrically actuating the inflator assembly 20 in response to sensing a rollover of the vehicle 12 and/or a side impact to the vehicle 12 above a predetermined threshold. The means 42 is electrically connected to the inflator assembly 20 for providing an actuation signal to the inflator assembly.

The inflator assembly 20 (FIG. 3) includes an inflator 50, a manifold 70, and a shroud 90. The inflator 50 has a generally cylindrical configuration centered on a longitudinal axis 60. The inflator 50 has a cylindrical center portion or side wall 52, which extends between a first end portion 54 and a second end portion 56 of the inflator. The side wall 52 has a cylindrical outer surface 58.

The inflator 50 includes a plurality of circular openings, or fluid outlets 62, which are spaced apart around the circumference of the inflator 50 at the first end portion 54 of the inflator 50. An electrical connector 64 extends axially from the first end portion 56.

The manifold 70 is a single-piece structure constructed of metal or plastic. The manifold 70 abuts the second end portion 56 of the inflator 50. The manifold 70 has a cylindrical inlet portion 72 (FIG. 4) centered on the axis 60. The inlet portion 72 has an outer diameter substantially equal to the outer diameter of the side wall 52 of the inflator 50.

The inlet portion 72 of the manifold 70 has an open end portion 74. The end portion 74 of the inlet portion 72 has an end surface 76, which is tapered for abutting engagement with the second end portion 56 of the inflator 50. The inlet portion 72 has a plurality of circular openings, or fluid inlets 78, spaced apart around the circumference of the inlet portion.

The manifold 70 has a cylindrical outlet portion 80 centered on the axis 60. The outer diameter of the outlet portion 80 is less than the outer diameter of the inlet portion 72, and is substantially equal to the outer diameter of the fill tube 22. The outlet portion 80 has a circular outlet 82. An annular shoulder 84 of the manifold 70 extends radially between the inlet portion 72 and the outlet portion 80.

The shroud 90 (FIG. 3) is constructed of a single piece of metal or other suitable material. The shroud 90 includes a cylindrical side wall 92 having an inner side surface 94 that defines a chamber 95. The inner side surface 94 of the shroud 90 and the cylindrical outer surface 58 of the inflator 50 define an annular fluid flow chamber, or passage 96. The passage 96 is disposed radially outward of the side wall 52 of the inflator 50 and radially inward of the side wall 92 of the shroud 90.

The shroud 90 has a first end portion 104 and an opposite second end portion 106. The first end portion 104 of the shroud 90 is disposed at the first end portion 54 of the inflator 50. The first end portion 104 of the shroud 90 includes a flat, annular end wall portion 108, which extends radially inward from the side wall 92 of the shroud 90 past the outer surface 58 of the inflator side wall 52. The wall portion 108 overlies the end of the inflator 50 and defines a circular opening 110 in the first end portion 104 of the shroud 90.

The circular opening 110 is sized to allow the electrical connector 64 of the inflator 50 to project through the opening 110, while the wall portion 108 of the shroud 90 blocks axial movement of the first end portion 54 of the inflator 50. The engagement of the wall portion 108 of the shroud 90 with the first end portion 54 of the inflator 50 closes the fluid flow passage 96 at the first end portion 54 of the inflator 50.

Before the shroud 90 is assembled to the inflator 50, the second end portion 106 of the shroud 90 has a cylindrical configuration extending axially from the side wall 92 as a continuation of the side wall 92. The second end portion 106 defines an opening through which the inflator 50 may be inserted into the interior of the shroud 90. During assembly of the inflator assembly 20, the inflator 50 is inserted through the opening in the second end portion 106 of the shroud 90 until the first end portion 54 of the inflator 50 abuts the end wall 108 of the shroud 90. The electrical connector 64 extends from the opening 110 in the first end portion 104 of the shroud 90. An electrical connector of the vehicle, with lead wires 122, is connected with the connector at a later time.

The tapered end surface 76 of the manifold 70 is placed in abutting engagement with the second end portion 56 of the inflator 50, so that the manifold 70 is coaxial with the inflator 50. An O-ring 130 is placed on the shoulder 84 of the manifold 70.

The second end portion 106 of the shroud 90 is then curled radially inward to the condition shown in FIG. 3. In this condition, the second end portion 106 of the shroud 90 includes an annular wall portion 112, centered on the axis 60, which engages and partially compresses the O-ring 130. The O-ring 130 thereby establishes a substantially airtight seal between the manifold 70 and the shroud 90. The second end portion 106 of the shroud 90 and the O-ring 130 thus close the fluid passage 96 at the second end portion 56 of the inflator 50. The annular wall portion 112 has a central opening 114 through which the outlet portion 80 of the manifold 70 extends.

The assembly of the inflator 50, the manifold 70, and the shroud 90 is placed adjacent the fill tube 22. The outlet portion 80 of the manifold 70 is connected in fluid communication with the first end portion 24 of the fill tube 22 by a known coupling or clamp indicated schematically at 140.

In the event of a rollover condition of the vehicle 12 or a side impact to the vehicle 12 of a magnitude greater than a predetermined threshold value, the sensing means 42 (FIG. 1) provides an electrical signal over the lead wires 122 to the inflator 50. The electrical signal causes the inflator 50 to be actuated. The inflator 50 emits inflation fluid through the fluid outlets 62 in the first end portion 54 of the inflator 50.

The inflation fluid flows radially outward through the fluid outlets 62 into the fluid flow passage 96. The inflation fluid in the fluid flow passage 96 flows axially through the fluid flow passage in a direction toward the manifold 70 and the second end portion 56 of the inflator 50 (to the left as viewed in FIG. 3).

The inflation fluid flows radially inward from the fluid flow passage 96 through the fluid inlets 78 in the manifold 70, into the inlet portion 72 of the manifold. The inflation fluid in the manifold 70 then flows axially out of the manifold 70, through the circular outlet 82 of the outlet portion 80 of the manifold, and into the first end portion 24 of the fill tube 22.

The fill tube 22 directs the fluid into the side curtain 14. The side curtain 14 inflates under the pressure of the inflation fluid from the inflator 50. The housing 28 (FIG. 1) opens, and the side curtain 14 inflates away from the roof 18 in a downward direction as shown in FIG. 2.

FIG. 6 illustrates an inflator assembly 220 constructed in accordance with a second embodiment of the invention. The inflator assembly 220 is usable with the fill tube 22 of the first embodiment, to direct inflation fluid under pressure into the fill tube 22. The inflator assembly 220 is similar in construction to the inflator assembly 20 (FIGS. 1–5), and parts that are the same or similar are given the same reference numerals with the suffix "a" attached.

The inflator assembly 220 includes an inflator 50a, which is similar in construction to the inflator 50. The inflator assembly 220 also includes a one-piece member 250 that performs the functions of both a shroud and a manifold.

The member 250 includes a central portion 252 having a cylindrical side wall 254 with a cylindrical inner surface 256 centered on the axis 60a. The side wall 254 has a first set of dimples 258, which extend radially inward from the side wall 254. The dimples 258 engage the outer side surface 58a of the inflator 50a to block radial movement of the inflator 50a relative to the member 250. The inner surface 256 of the side wall 254 and the cylindrical outer surface 58a of the inflator 50a define between them an annular fluid flow passage 296. The dimples 258 are disposed in the fluid flow passage 296. The first set of dimples 258 may alternatively be replaced by flutes that run axially along the side wall 254.

A first end portion 304 of the member 250 extends radially inward from the side wall 254 in a direction toward the axis 60a. The first end portion 304 has an annular configuration defining a central opening 310 centered on the axis 60a. An electrical connector 64a of the inflator 50a extends through the opening 310.

A second end portion 306 of the member 250 is configured as a funnel and extends from the second end portion 56a of the inflator 50a. The second end portion 306 of the member 250 performs the function of the manifold 70 (FIGS. 1–5). Specifically, the second end portion 306 of the member 250 has a relatively large diameter inlet portion 310, about the same diameter as the central portion 252 of the member 250, that tapers to a relatively small diameter outlet portion 312, which is about the same diameter as the fill tube 22.

A second set of dimples 260 on the member 250, at the inlet portion 310 of the second end portion 306 of the member 250, extend radially inward to engage a planar end surface 57 of the inflator 50a. The inflator 50a is clamped axially between the second set of dimples 260 and the first end portion 304 of the member 250, to block axial movement of the inflator 50a within the member 250.

The second end portion 306 of the member 250 is connectable in fluid communication with the first end portion 24 of the fill tube 22 by the coupling 140. The inflator 50a, when actuated, directs inflation fluid into the fluid flow passage 296. The inflation fluid flows past the first and second sets of dimples 258, 260 and into the second end portion 306 of the member 250. The inflation fluid then flows from the outlet 312 of the member 250 and into the fill tube 22.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus for helping to protect an occupant of a vehicle in the event of a side impact to the vehicle or a rollover of the vehicle, said apparatus comprising:

an inflatable vehicle occupant protection device having a deflated condition and being inflatable into a position adjacent to the vehicle occupant for helping to protect the vehicle occupant;

an inflator electrically actuatable to provide inflation fluid for inflating said protection device, said inflator having a longitudinal axis, a first end portion having a fluid outlet of said inflator, a central portion, and a second end portion opposite said first end portion;

a fill tube extending from a location adjacent said second end portion of said inflator for directing inflation fluid from said inflator into said protection device; and an assembly for directing inflation fluid from said fluid outlet of said inflator to said fill tube, said assembly comprising a manifold and a shroud having a chamber for receiving said inflator, said manifold being located at said second end portion of said inflator and in fluid communication with said fill tube and said chamber;

said shroud defining a fluid flow passage between said fluid outlet of said inflator and said manifold.

2. An apparatus as set forth in claim 1 wherein said first end portion of said inflator has an electrical connector for receiving an actuating signal for said inflator.

3. An inflator as set forth in claim 1 wherein said shroud has a first end portion connected with said first end portion of said inflator for closing said fluid flow passage at said first end portion of said inflator and a second end portion connected with said second end portion of said inflator for closing said fluid flow passage at said second end portion of said inflator; and said manifold has a fluid inlet in fluid communication with said fluid flow passage for directing inflation fluid from said fluid flow passage into said manifold, said manifold having a fluid outlet for directing inflation fluid from said manifold into said fill tube.

4. An apparatus as set forth in claim 1 wherein said shroud is constructed from a single piece of material.

5. An apparatus as set forth in claim 1 wherein said manifold includes a cylindrical inlet portion and a cylindrical outlet portion.

6. An apparatus as set forth in claim 1 wherein said manifold includes a plurality of fluid inlets spaced apart around a circumference of an inlet portion.

7. An apparatus as set forth in claim 1 wherein said shroud and said manifold are constructed from a single piece of material.

8. An apparatus as set forth in claim 1 wherein said fluid flow passage has an annular configuration extending around said inflator.

9. An apparatus as set forth in claim 1 further including a set of dimples for radially securing said inflator in place along said longitudinal axis.

* * * * *